(12) United States Patent  (10) Patent No.: US 6,691,971 B2
Yamada et al.  (45) Date of Patent: Feb. 17, 2004

(54) SEAT SLIDE DEVICE

(75) Inventors: Yukifumi Yamada, Toyota (JP);
Takami Terada, Toyota (JP); Hiroyuki Okazaki, Chiryu (JP); Toshiyuki Tanaka, Toyota (JP); Hideki Kobayashi, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/291,701

(22) Filed: Nov. 12, 2002

(65) Prior Publication Data
US 2003/0094558 A1 May 22, 2003

(30) Foreign Application Priority Data
Nov. 12, 2001 (JP) .......................... 2001-346637

(51) Int. Cl.[7] ............................................. F16M 13/00
(52) U.S. Cl. ...................................................... 248/430
(58) Field of Search ................................. 248/430, 429, 248/424; 297/344.1; 296/65.14

(56) References Cited

U.S. PATENT DOCUMENTS

| | | | | | |
|---|---|---|---|---|---|
| 4,209,159 | A | * | 6/1980 | Becker et al. | 248/430 |
| 4,821,991 | A | * | 4/1989 | Aihara et al. | 248/430 |
| 5,447,352 | A | * | 9/1995 | Ito et al. | 296/65.14 |
| 5,456,439 | A | * | 10/1995 | Gauger | 248/429 |
| 6,220,642 | B1 | * | 4/2001 | Ito et al. | 296/65.14 |

FOREIGN PATENT DOCUMENTS

JP  10-315810 A  12/1998

* cited by examiner

*Primary Examiner*—Ramon O. Ramirez
(74) *Attorney, Agent, or Firm*—Burns, Doane, Swecker & Mathis, LLP

(57) ABSTRACT

A seat slide device for a vehicle includes a lower rail, an upper rail and a shoe. The shoe includes a base portion attached to an engaging portion of one of the rails and a slide portion slidable along an engaged portion of the other rail. The slide portion and the base portion are integrally formed with one another. The slide portion contacts the base portion when a load equal to or greater than a predetermined load is applied, and the base portion has a surface possessing a shape which increases the contact area with the slide portion when the load increases.

20 Claims, 5 Drawing Sheets

Sliding Direction

SEAT SLIDE DEVICE

FIELD OF THE INVENTION

This invention generally relates to a vehicle seat. More particularly, the invention pertains to a seat slide device for slidably supporting a vehicle seat and fixing the position of a vehicle seat relative to the floor.

BACKGROUND OF THE INVENTION

A known seat slide device is disclosed in Japanese Patent Laid-Open Publication No.10-315810. This known seat slide device is disposed between the seat and the floor of the vehicle, with shoes being interposed between an upper rail fixed to the seat and a lower rail fixed to the floor so that the upper rail is able to relatively smoothly slide on the lower rail. In the known device, rollers for supporting the load from the seat side are disposed between the upper rail and the lower rail, and the shoes are provided to prevent excessive play by a space provided to roll the rollers. When the load in an upward direction is applied to the seat slide device, small projections disposed on upper surfaces of the shoes are elastically deformed to prevent excessive play. On the other hand, when a load in the lateral direction is applied, excessive play is prevented by elastic deformation of the shoes.

However, with the known seat slide device which relies on elastic deformation of the small projections to prevent the excessive play when a load is applied in the upward direction, the known seat slide device cannot prevent play which exceeds a range of the elastic deformation of the small projection. To solve this drawback, it is necessary to manufacture each of the rails with relatively precise dimensions. As a result, the manufacturing cost increases.

Another way to prevent excessive play would be to increase the range of the bending amount of the small projections by enlarging the projections. However, a large bending amount would be recognized as excessive play by a passenger, and so the effect of the projections is reduced.

SUMMARY OF THE INVENTION

According to one aspect, a seat slide device mounted in a vehicle includes a lower rail supported on a floor of the vehicle, an upper rail slidably engaged with the lower rail and supporting a seat, and a shoe attached to an engaging portion provided at one of the lower rail and the upper rail. An engaged portion formed at the other of the lower rail and the upper rail to be engaged with the engaging portion through the shoe. The shoe includes a base portion attached to the engaging portion and a slide portion sliding with the engaged portion and integrally formed with the base portion, with the slide portion coming in contact with the base portion when a load applied to the slide portion exceeds a predetermined value. The base portion has a contact surface possessing a shape which increases the contact area with the slide portion when the load increases after reaching the predetermined value.

According to another aspect, a seat slide device adapted to be mounted in a vehicle includes a first rail and a second rail, with one of the rails being adapted to be secured on a floor of the vehicle and the other of the rails being adapted to support a seat, and with the rail which is adapted to support the seat being slidably engaged with the rail that is adapted to be secured on the floor of the vehicle. The seat slide device also includes a pair of shoes each having a base portion mounted at the first rail and a slide portion integrally formed in one piece with the base portion. The slide portion is positioned between the base portion and a part of the second rail and slidably engages the part of the second rail. The base portion and the slide portion of each shoe are configured so that an increasing load applied to the slide portion which exceeds a predetermined value causes an increase in the contact area between the slide portion and the base portion.

In accordance with a further aspect, a seat slide device which is adapted to be mounted in a vehicle includes first and second rails, one of which is adapted to be secured on a floor of the vehicle and the other of which is adapted to support a seat, with the rail which is adapted to support the seat being slidably engaged with the rail that is adapted to be secured on the floor of the vehicle to adjust the position of the seat. The seat slide device also includes a plurality of rollers positioned between the first and second rails, and a pair of shoes. Each of the shoes includes a base portion mounted at the first rail and a slide portion integrally formed in one piece with the base portion. The slide portion is positioned between the base portion and a part of the second rail, and slidably engages the part of the second rail. Both the slide portion and the base portion have surfaces facing one another. The base portion and the slide portion have a configuration such that in the absence of a load applied to the slide portion which exceeds a predetermined value the surface of the slide portion is out of contact with the surface of the base portion, and in the presence of a changing load applied to the slide portion which exceeds the predetermined value the surface of the slide portion contacts the surface of the base portion with a contact area between the surface of the slide portion and the surface of the base portion varying.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION

Figure 1:
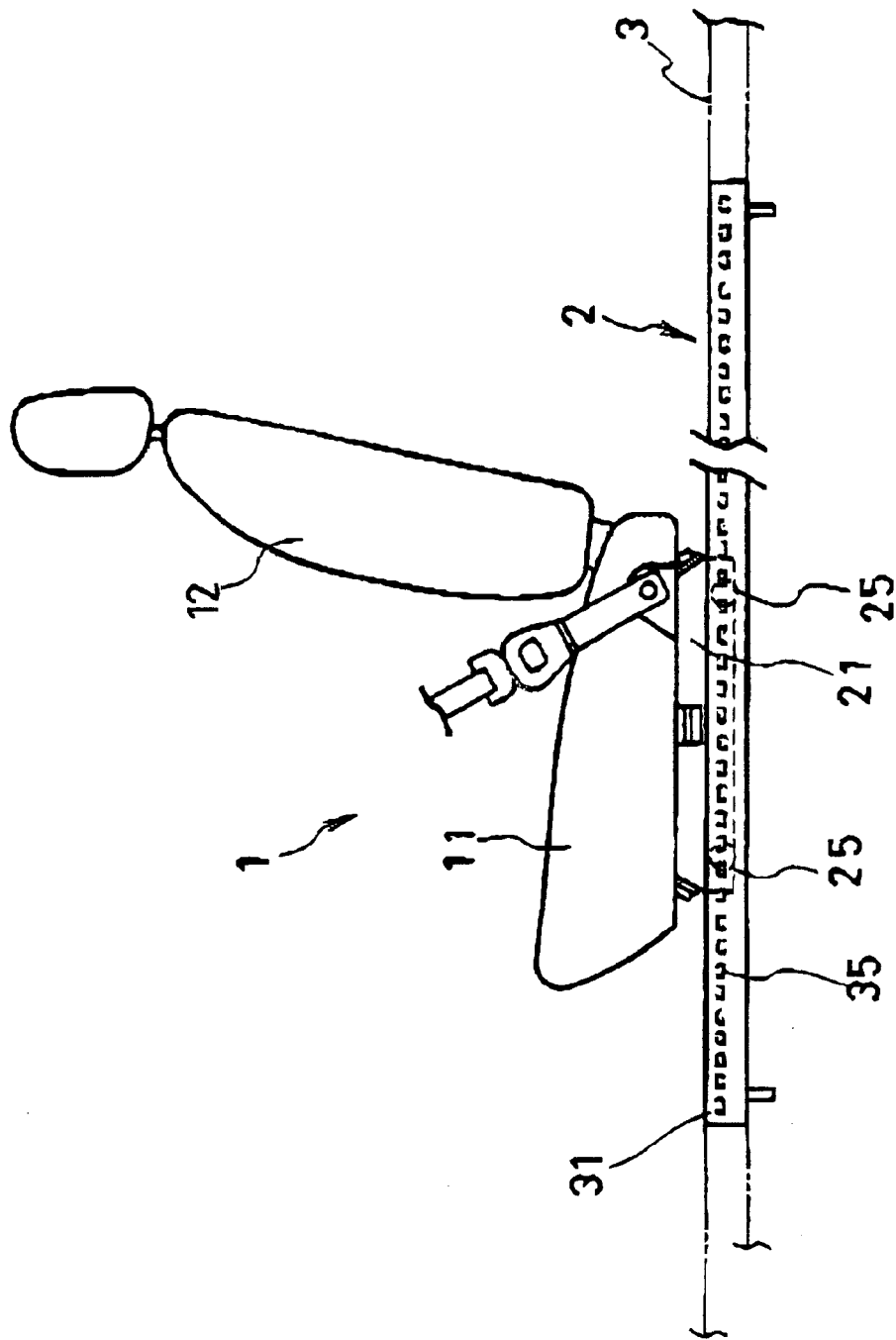
FIG. 1 is a side view of a seat slide device and a seat body according to an embodiment of the present invention.

A seat slide device 2 according to an embodiment of the present invention is generally illustrated in FIG. 1. The seat slide device 2 is illustrated as being mounted on the floor 3 of a vehicle. The seat slide device 2 is comprised of a lower rail 31 fixed to the floor 3 and an upper rail 21 slidable relative to the lower rail 31. The upper rail 21 is constructed to support the seat 1. Normally, the lower rail 31 is extended in its longitudinal direction so that the seat 1 can be adjusted to a desired position or can be moved from a determined position to provide a space to load and unload luggage or other articles.

Four rollers 25 are disposed at the upper rail 21. The upper rail 21 slides on the lower rail 31 by way of the rollers 25 rolling inside the lower rail 31. To provide relatively smooth sliding of the rollers 25, gaps are formed upwardly and at both sides of the rollers 25 relative to the lower rail 31. To prevent excessive play at the seat 1 generated by these gaps, several shoes 5 (shown in more detail in FIG. 3) are interposed between the upper rail 21 and the lower rail 31.

Figure 2:
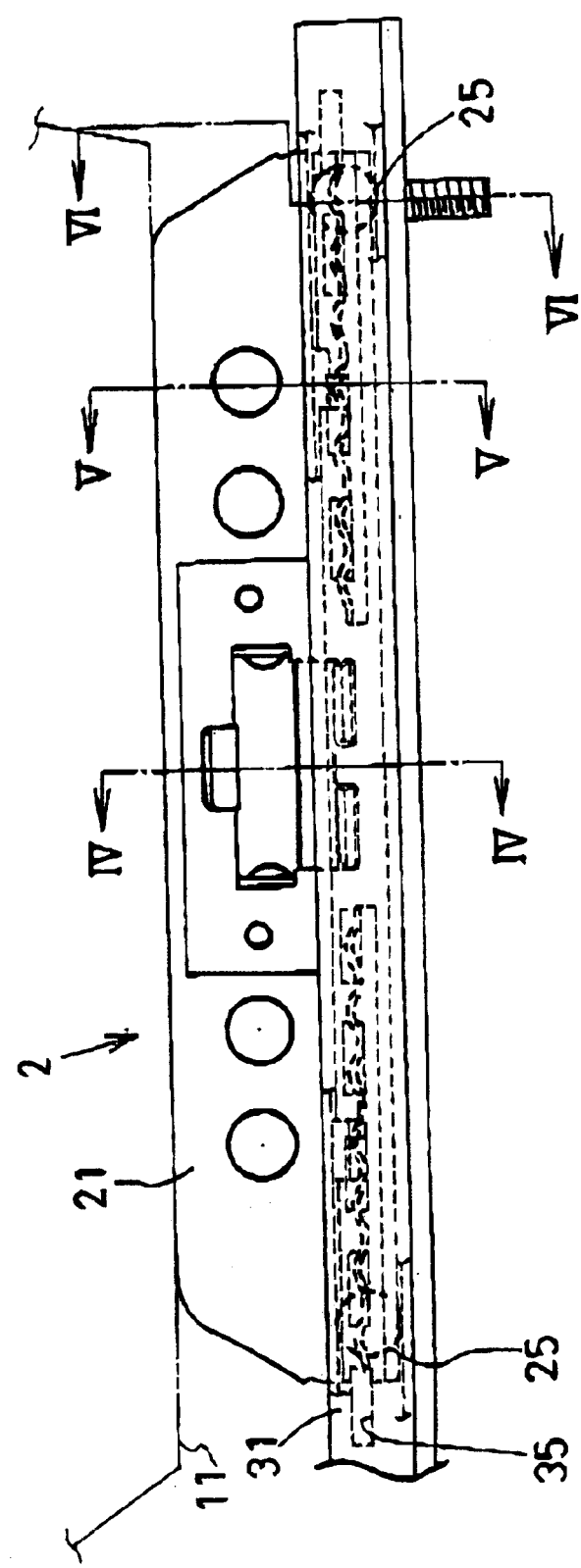
FIG. 2 is a side view of the upper rail portion of the seat slide device shown in FIG. 1.
Figure 3:
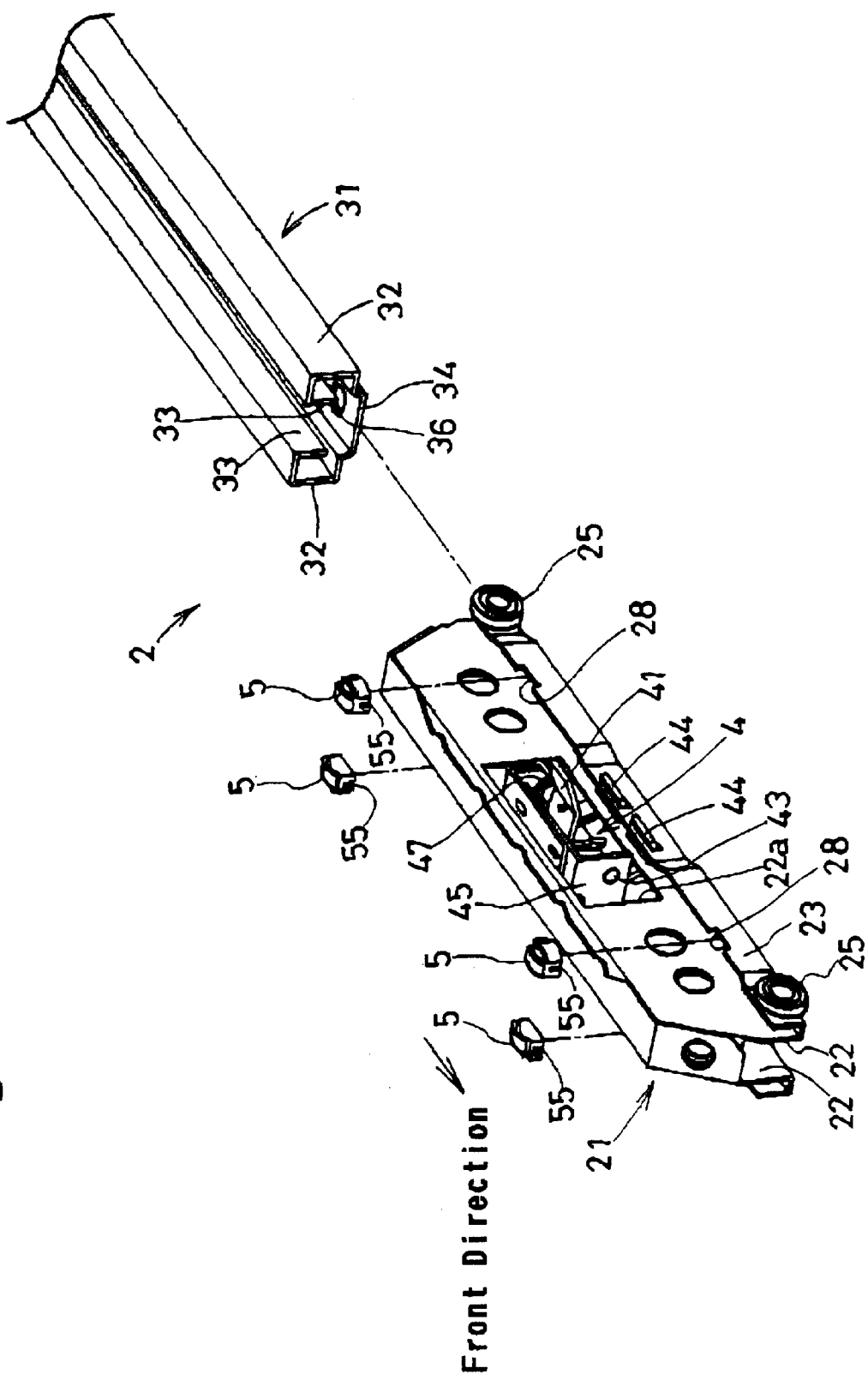
FIG. 3 is a perspective view of a portion of the seat slide device shown in FIG. 1.
Figure 4:
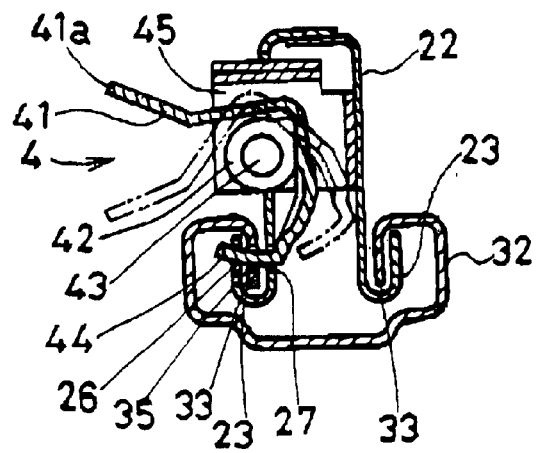
FIG. 4 is a cross-sectional view of the seat slide device taken along the section line IV—IV in FIG. 2.
Figure 5:
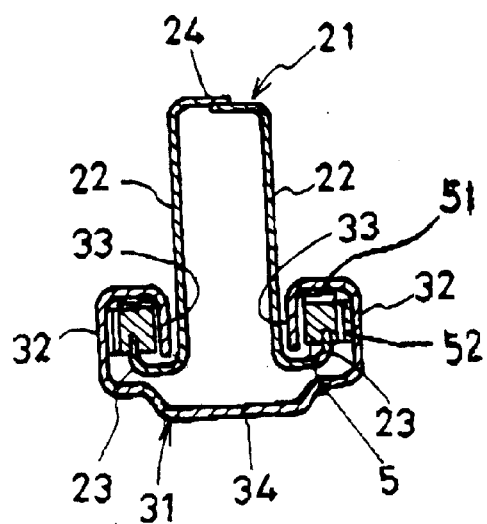
FIG. 5 is a cross-sectional view of the seat slide device taken along the section line V—V in FIG. 2.

FIGS. 2–5 illustrate additional details associated with the seat slide device and the shoes. The arrow shown in FIG. 3 designates the forward direction, that is the front direction of the seat 1. As shown in FIGS. 3 and 5, the upper rail 21 has a pair of vertical walls 22 positioned perpendicular to the longitudinal direction of the upper rail 21. The vertical walls 22 face each other and are spaced apart from one another to define a space between the two vertical walls 22. The upper portions of the vertical walls 22 are bent to engage or overlap one another, thus forming an upper portion 24 of the upper rail at which the ends of the vertical walls 22 that overlap one another are welded together. The lower end portions of the vertical walls 22 are bent in an opposite direction from each other (i.e., away from one another), thus forming a pair of flanges 23. The flanges 23 are thus provided at both ends of the upper rail 21, and each end of each flange 23 is bent upward to project upwardly so that the two vertical walls form symmetrical J-shapes with respect to one another.

As also shown in FIGS. 3 and 5, the lower rail 31 has a bottom wall 34 extending laterally in a direction perpendicular to a longitudinal direction of the lower rail 31. The bottom wall 34 is in contact with the floor 3. The lower rail 31 also has a pair of vertical walls 32 extending upwardly from both ends of the bottom wall 34. The lower rail 31 is formed to possess a generally U-shape, opening upwardly. The lower rail further includes a pair of flanges 33, each located at the upper end of one of the vertical walls 32. The flanges 33 are bent to face inwardly toward each other and toward the inside of the cross-section of the lower rail 31. In addition, the flanges 33 are further bent downward so as to be generally parallel with the vertical walls 32.

As shown in FIG. 3, a lock mechanism 4 of the seat slide device 2 is attached nearly at the central portion of the upper rail considered with reference to the longitudinal direction of the upper rail 21. Additionally, as shown in FIGS. 3 and 4, a window 22a opens outwardly at a central portion of one of the vertical walls 22 of the upper rail 21, and a bracket 45 is positioned in this window 22a and is fixed to the inner surface of the other vertical wall 22. A lock lever 41 is rotatably attached to the bracket 45 by a pin 43. An operation portion 41a of the lock lever 41 is formed at the upper end of the lock lever 41, and a flange 42 is axially connected with the pin 43 at a central portion of the lock lever 41. Further, a hooking portion 44 is formed at the lower end of the lock lever 41.

As shown in FIG. 4, when the lower rail 31 and the upper rail 21 are in a locked condition, the hooking portion 44 is positioned in or passes through a positioning hole 27 formed at one of the vertical walls 22 of the upper rail 21, a positioning hole 26 formed at one of the flanges 23 of the upper rail, and one of the positioning holes 35 formed at one of the flanges 33 of the lower rail 31. The locked condition is maintained by a spring 47, shown in FIG. 3, interposed between the lock lever 41 and the bracket 45. The lower rail 31 and the upper rail 21 are unlocked by operating the lock lever 41 to rotate the lock lever 41 to a position shown with a double-dashed line in FIG. 4. The lock lever 41 is thus rotated against the spring force of the spring 47. As shown in FIGS. 1 and 2, a plurality of the positioning holes 35 are formed in the longitudinal direction of the lower rail 31 at generally equal intervals within an adjustment range of the seat slide device 2. The position of the seat 1 can thus be adjusted within this adjustment range.

As shown in FIGS. 3 and 5, in the longitudinal direction of the upper rail 21, two pairs of the shoes 5 are attached to the upper rail 21. The two pairs of shoes 5 are positioned at the front and back portions of the upper rail 21 at predetermined intervals on both sides of the lock mechanism 4. As shown in FIG. 3 and in more detail in FIG. 7, the shoes 5 have attachment grooves 55. The flanges 23 of the upper rail 21 are provided with notches 28 for locating or positioning the shoes. That is, each of the shoes 5 is fitted in one of the notches 28 by way of the attachment grooves 55. The shoes 5 are attached or mounted so as to slide with or against the inner surfaces of the vertical walls 32 of the lower rail 31 and the inner surfaces of the upper portions of the flanges 33.

Figure 7:
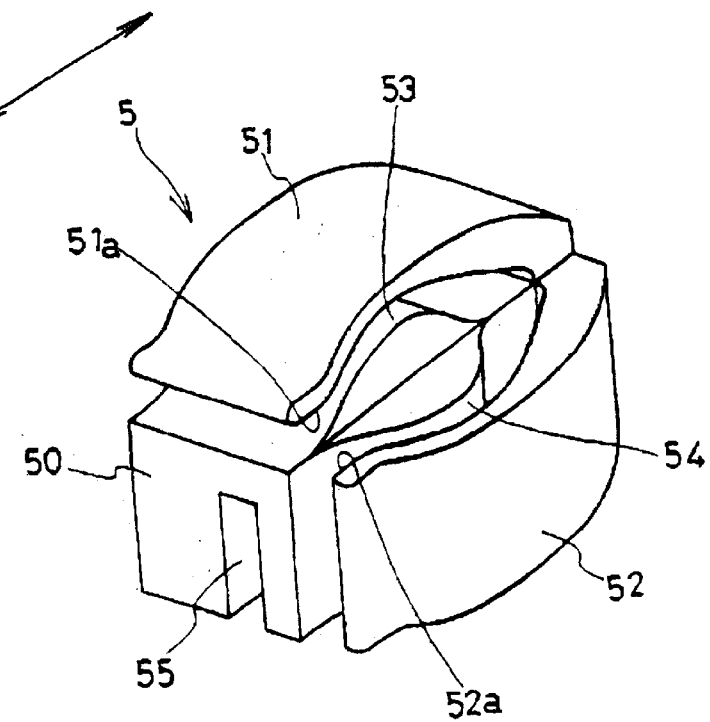
FIG. 7 is a perspective view of a shoe used in the seat slide device shown in FIG. 1.

The shoe 5 is made of a resin material having a relatively small sliding resistance to steel material while also possessing relatively strong abrasion resistance. As shown in FIG. 7 which is an enlarged illustration of one of the shoes 5, the shoe 5 has a base portion 50, an upper slide portion 51 arranged at the upper surface of the base portion 50, and a lateral slide portion 52 arranged at one of the side surfaces of the base portion 50. The base portion includes a vertical base portion 53 (i.e., a portion of the base which faces vertically upwardly) and a lateral base portion 54 (i.e., a portion of the base which faces laterally or to the side).

Each slide portion 51, 52 extends in the sliding direction of the seat slide device 2 (i.e., the direction shown with an arrow in FIG. 7), and the central portions of the slide portions 51, 52 are curved in the upward and outward lateral directions, respectively, relative to the shoe 5. Each of the slide portions 51, 52 is integrally formed in one piece with the base portion 50 in the manner shown in FIG. 7. In the illustrated embodiment, one end of each of the slide portions 51, 52 is integrally formed in one piece with the base portion 50, thus forming a fixing portion of each of the slide portions, while the remainder of each slide portion 51, 52 extends from the fixing portion in a cantilever manner.

When a load directed towards the base portion 50 is applied to the slide portions 51, 52, the slide portions 51, 52 are bent, and when the load reaches a predetermined weight or amount, the slide portions 51, 52 are brought into contact with the base portion 50. The central portions of the surfaces of the vertical base portion 53 and the lateral base portion 54 which are adapted to contact the slide portions 51, 52 are curved toward the upper slide portion 51 and the lateral slide portion 52 respectively. Thus, when the load increases, the contact areas of the slide portions 51, 52 with respect to the base portion 50 also increase. The relationship between the bending amount of the slide portions 51, 52 and the increasing amount of the load is not necessarily a proportional relation, but can be a square or logarithmic relationship, with the relationship being set at an appropriate characteristic so that a passenger does not recognize the excessive play. Also, since large areas of the slide portions 51, 52 are in contact with the vertical and lateral base portions 53, 54, even when an excessive load is applied to each of the slide portions 51, 52, the slide portions 51, 52 are not damaged.

Figure 6:
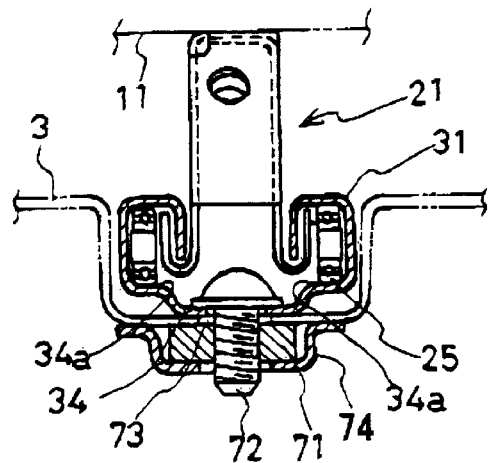
FIG. 6 is a cross sectional view of the seat slide device taken along the section line VI—VI in FIG. 2.

Furthermore, as shown in FIGS. 3 and 6, in the longitudinal direction of the upper rail 21, two pairs of rollers 25 are rotatably attached to the front and back portions of the upper rail 21 at both ends of the flanges 23 respectively. The rollers 25 roll on horizontal rolling surfaces 34a formed at both sides of the bottom wall 34 of the lower rail 31, thus supporting the load from the weight of the seat and the passenger in a downward direction applied to the upper rail 21.

As shown in FIG. 6, a hole 73 is formed on the floor 3 of the vehicle in which the seat slide device 2 is attached. Also, in the part of the floor 3 at which the hole 73 is disposed, a case 74 for retaining (e.g., surrounding) a nut 71 is attached to the lower surface of the floor 3. The case 74 can be moved in a horizontal direction relative to the floor 3 within a predetermined range of the inside of the case 74 so that the position of the seat slide device 2 can be adjusted when the lower rail 31 is fixed on the floor 3 by inserting a bolt 72 through an attachment hole 36 of the lower rail 31 (see FIG. 3).

With the above-described seat slide device 2, the passenger can move the seat 1 along the elongated lower rail 31 that is fixed on the floor 3 by pushing the operation portion 41a of the lock lever 41 in a downward direction (i.e., the condition shown with the double-dashed line in FIG. 4) to unlock the lock mechanism 4. Also, the seat 1 can be fixed at a desired position by releasing the lock lever 41 to operate the lock mechanism 4. With this construction, the seat 1 can be arranged at a desired seating position for the passenger, or can be arranged at a position allowing loading or unloading of luggage or other articles.

In the seat slide device 2 described above, the load or vibration in the front, back, vertical, or lateral direction relative to the seat 1 is elastically supported in accordance with the weight of the load by the shoes 5 arranged between the upper rail 21 and the lower rail 31 formed with the upper or vertical slide portion 51 and the lateral slide portion 52. Even when the seat 1 is empty, excessive play of the seat 1 is also inhibited or prevented because the slide portions 51, 52 are in contact with the inner surfaces of the vertical walls 32 of the lower rail 31 and the inner surfaces of the upper portions of the flanges 33 respectively.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A seat slide device mounted in a vehicle comprising:
   a lower rail supported on a floor of the vehicle;
   an upper rail slidably engaged with the lower rail and supporting a seat;
   a shoe attached to an engaging portion provided at one of the lower rail and the upper rail; and
   an engaged portion formed at the other of the lower rail and the upper rail to be engaged with the engaging portion through the shoe;
   the shoe comprising a base portion attached to the engaging portion and a slide portion sliding with the engaged portion and integrally formed with the base portion, the slide portion coming in contact with the base portion when a load applied to the slide portion exceeds a predetermined value, and the base portion having a contact surface possessing a shape which increases a contact area with the slide portion when the load increases after reaching the predetermined value.

2. The seat slide device for a vehicle according to claim 1, wherein the shoe has at least one pair of slide portions facing in directions perpendicular to one another and at least one pair of contact surfaces contacted by the slide portions when the load applied to the slide portions exceeds the predetermined value.

3. The seat slide device for a vehicle according to claim 2, wherein the shoe is made of an elastic material.

4. The seat slide device for a vehicle according to claim 3, wherein the slide portions each have a fixing portion extending upright from the base portion and a cantilever portion extended from the fixing portion.

5. The seat slide device for a vehicle according to claim 4, wherein the slide portions and the contact surfaces of the base portion are curved in vertical and lateral directions relative to the shoe respectively.

6. A seat slide device adapted to be mounted in a vehicle comprising:
   a first rail;
   a second rail;
   one of the first and second rails being adapted to be secured on a floor of the vehicle and the other of the first and second rails being adapted to support a seat;
   the other of the first and second rails which is adapted to support the seat being slidably engaged with the one of the first and second rails that is adapted to be secured on the floor of the vehicle;
   a pair of shoes each comprising a base portion mounted at the first rail and a slide portion integrally formed in one piece with the base portion, the slide portion being positioned between the base portion and a part of the second rail and slidably engaging the part of the second rail, the slide portion being adapted to contact the base portion upon application of a load to the slide portion exceeding a predetermined value;
   the base portion and the slide portion being configured so that an increasing load applied to the slide portion exceeding the predetermined value causes an increase in a contact area between the slide portion and the base portion.

7. The seat slide device for a vehicle according to claim 6, wherein the slide portion of each shoe is a lateral slide portion positioned between the base portion and an upstanding wall of the second rail.

8. The seat slide device for a vehicle according to claim 7, wherein each shoe also comprises a vertical slide portion positioned between the base portion and a laterally extending flange of the second rail positioned above the shoe, the vertical slide portion slidably engaging the laterally extending flange of the second rail, the base portion and the vertical slide portion being configured so that an increasing load applied to the vertical slide portion which exceeds the predetermined value causes an increase in a contact area between the vertical slide portion and the base portion.

9. The seat slide device for a vehicle according to claim 6, wherein the slide portion is a vertical slide portion positioned between the base portion and a laterally extending flange of the second rail positioned above the shoe.

10. The seat slide device for a vehicle according to claim 6, wherein each shoe is made of elastic material.

11. The seat slide device for a vehicle according to claim 6, wherein the slide portion of each shoe comprises a fixing portion at which the slide portion is integrally formed in one piece with the base portion and a cantilever portion extending from the fixing portion.

12. The seat slide device for a vehicle according to claim 6, wherein the contact area between the slide portion and the base portion of each shoe comprise a curved contact surface on the slide portion that faces a curved contact surface on the base portion.

13. The seat slide device for a vehicle according to claim 6, wherein the first rail is an upper rail and the second rail is a lower rail.

14. The seat slide device for a vehicle according to claim 6, wherein each shoe is mounted on the first rail by way of a groove in the base portion that receives a vertically extending flange of the upper rail.

15. A seat slide device adapted to be mounted in a vehicle comprising:

a first rail;

a second rail;

one of the first and second rails being adapted to be secured on a floor of the vehicle and the other of the first and second rails being adapted to support a seat;

the other of the first and second rails which is adapted to support the seat being slidably engaged with the one of the first and second rails that is adapted to be secured on the floor of the vehicle to adjust a position of the seat;

a plurality of rollers positioned between the first and second rails;

a pair of shoes each comprising a base portion mounted at the first rail and a slide portion integrally formed in one piece with the base portion, the slide portion being positioned between the base portion and a part of the second rail, the slide portion slidably engaging the part of the second rail;

the slide portion having a surface facing a surface of the base portion;

the base portion and the slide portion having a configuration such that in the absence of a load applied to the slide portion which exceeds a predetermined value the surface of the slide portion is out of contact with the surface of the base portion, and in the presence of a changing load applied to the slide portion which exceeds the predetermined value the surface of the slide portion contacts the surface of the base portion with a contact area between the surface of the slide portion and the surface of the base portion varying.

16. The seat slide device for a vehicle according to claim 15, wherein the slide portion of each shoe is a lateral slide portion positioned between the base portion and an upstanding wall of the second rail.

17. The seat slide device for a vehicle according to claim 15, wherein the slide portion of each shoe is a first slide portion, each shoe including a second slide portion positioned between the base portion and a part of the second rail, the first and second slide portions of each shoe facing in directions perpendicular to one another.

18. The seat slide device for a vehicle according to claim 15, wherein each shoe is made of elastic material.

19. The seat slide device for a vehicle according to claim 15, wherein the slide portion of each shoe comprises a fixing portion at which the slide portion is integrally formed in one piece with the base portion and a cantilever portion extending from the fixing portion.

20. The seat slide device for a vehicle according to claim 15, wherein the surface of the slide portion and the surface of the base potion are curved.

* * * * *